(No Model.)
C. E. SCRIBNER.
TELEPHONE SWITCH.
No. 473,966. Patented May 3, 1892.
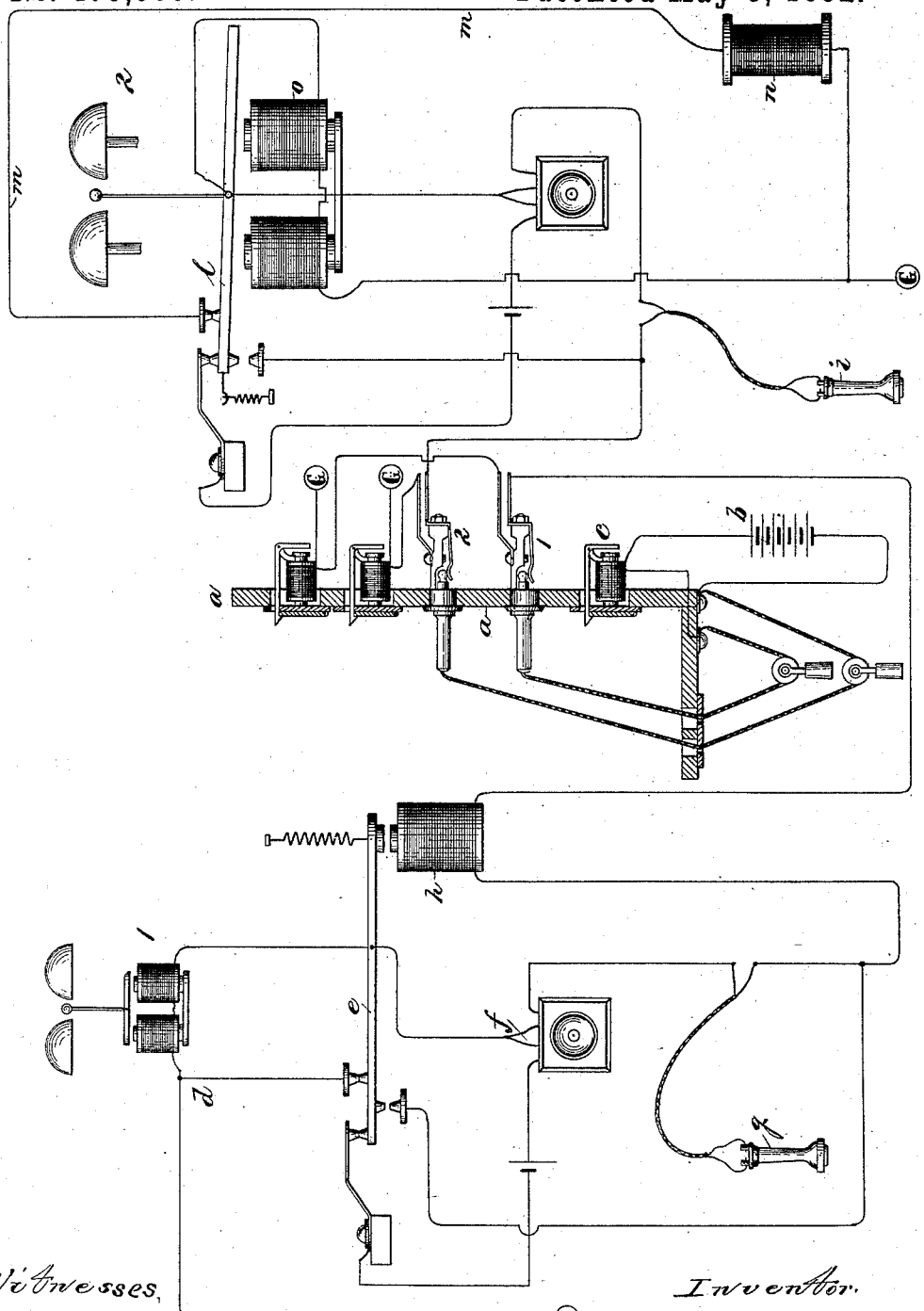
Witnesses,
Henry Faulkner,
Sam. B. Dover,
Inventor,
Charles E. Scribner,
By George P. Barton
Attorney.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

TELEPHONE-SWITCH.

SPECIFICATION forming part of Letters Patent No. 473,966, dated May 3, 1892.

Application filed August 19, 1884. Renewed October 16, 1891. Serial No. 408,862. (No model.)

*To all whom it may concern:*

Be it known that I, CHARLES E. SCRIBNER, a citizen of the United States, residing at Chicago, in the county of Cook and State of Illinois, have invented a certain new and useful Improvement in Telephone-Switches, (Case No. 83,) of which the following is a full, clear, concise, and exact description, reference being had to the accompanying drawing, forming a part of this specification.

My invention relates to telephone-switches; and it consists in a battery placed in the circuit of the connecting-cords at the central office, electro-magnets, one at each of the subscribers' stations, and switch levers or armatures operated by said electro-magnets as the circuit of the battery is closed to line.

By the use of my invention the bells of any two subscribers may be cut out or shunted and their telephones brought into circuit automatically by the operator at the central office as he connects the lines. When the lines are disconnected, the telephones are cut out or shunted, while the bells are again brought into circuit.

My invention is illustrated in the accompanying drawing, in which I have shown two telephone-lines connected together upon the switchboard at the central office and extending to their different subscribers' stations.

The switchboard $a$ is placed at the central office and may be of any well-known form. I prefer, however, the standard switchboard shown. The battery $b$ is shown included in the circuit of the connecting-cords.

I have not shown the operator's outfit for receiving and answering the calls, as any well-known outfit may be used and operated in any well-known way.

The clearing-out annunciator $c$ should be polarized in order that it may not be thrown down by current from the battery $b$.

As shown in the drawing, the circuit between subscribers at stations 1 and 2 may be traced as follows: Beginning at ground at station 1 the circuit may be traced to connection $d$, thence to the switch $e$, and thence by wire $f$ through the induction-coil in the microphone to the telephone $g$, and thence through the electro-magnet $h$, and thence to the spring-jack switch 1 on the switchboard $a$ at the central office, and thence through the pair of cords and battery $b$ and clearing-out annunciator $c$ to spring-jack switch 2, and thence to the telephone $i$ at station 2, and thence through the induction-coil in the microphone, and thence to the switch-lever $l$, and thence by wire $m$ through the resistance-coil $n$ and to ground. A derived circuit is also formed from the switch-lever $l$ through the electro-magnets $o$, in this case being the electro-magnets of the bell, and thence to ground. The bells at stations 1 and 2 are polarized, though I have not shown the extra permanent magnets for producing polarization.

The armature-levers $e$ and $l$, which with their electro-magnets form relays, serve as telephone-switches at the different subscribers' stations. These relays are operated to bring the telephones into circuit, as shown, when the two lines are connected together at the central office by means of the pair of cords and plugs including the battery $b$, since when the said battery is closed through electro-magnets $o$ $h$ the armature-levers $e$ and $l$, which serve respectively as telephone-switches, are brought to the positions shown, cutting out the polarized bells, while at the same time the local-transmitter circuits are closed and the telephones brought into circuit, as shown. On disconnecting the lines by removing either of the plugs, the battery $b$ is removed from the circuit and the switches $e$ and $l$ at once resume their normal positions, bringing the bells into circuit, cutting out the telephones, and opening the local-transmitter circuits. It will be seen that at station 1 I have shown the extra electro-magnet $h$ for operating the switch. This form of apparatus I prefer to use. At station 2 the armature-lever of the bell is extended so as to form the switch-lever, the electro-magnet $o$ thus serving to operate both the bell and the switch. The resistance-coil $n$ is sufficient to cause current enough to flow through the coils of electro-magnet $o$ to hold the armature-lever $l$ in the position shown as long as battery $b$ remains closed to line.

The clearing-out annunciator $c$ may be operated from either station, but being polarized and in circuit in the proper direction with battery $b$ it will not be operated by current from said battery.

I have not shown the generators at the different stations, as they are so well known.

I claim—

1. The combination, at the central office, of a battery and switching apparatus for connecting two telephone-lines together in the circuit of said battery and relays included in the telephone-lines at the different stations, whereby the telephones of two lines when connected are brought into circuit, substantially as and for the purpose specified.

2. The combination, with a telephone-line connecting a subscriber's station with the central office, of a bell and telephone, said bell and telephone being connected with the said telephone-line at the subscriber's station, and a battery included in the circuit of the line at the central office, and a relay or electro-magnetic switching device at the subscriber's station included in the line, whereby the telephone is brought into the circuit of the line when the electro-magnetic device is operated by the battery, while at the same time the bell is disconnected from the circuit of the line.

3. An electro-magnet, in combination with a telephone-switch controlled by the armature of the electro-magnet, a shunt-circuit including resistance adapted to be closed by the switch around the electro-magnet, and a telephone-circuit adapted to be shunted by the same movement of the switch which opens the said shunt-circuit including resistance.

In witness whereof I hereunto subscribe my name this 9th day of August, A. D. 1884.

CHARLES E. SCRIBNER.

Witnesses:
GEORGE P. BARTON,
E. P. WARNER.